United States Patent Office 3,529,017
Patented Sept. 15, 1970

3,529,017
ALKALINE HYDROLYSIS OF POLYIMIDES
Emmette F. Izard, Kenmore, and William B. Lindsey, Williamsville, N.Y., assignors to E. I. du Pont de Nemours and Company, Wilmington, Del., a corporation of Delaware
No Drawing. Filed Jan. 6, 1966, Ser. No. 518,976
Int. Cl. C07c 51/00, 51/06, 85/00
U.S. Cl. 260—515                                     10 Claims

ABSTRACT OF THE DISCLOSURE

A process for recovery of valuable monomers from scrap polyimide polymeric materials is provided which comprises, briefly, (1) dissolving the polyimide in an aqueous hydroxide solution, (2) heating the aqueous solution at a temperature between about 100° C. and about 200° C., (3) cooling said aqueous solution and precipitating and separating therefrom one of said monomeric materials, (4) adding a mineral acid to said solution for precipitating another monomeric material, and (5) recovering said other monomeric material from said solution.

---

This invention relates to polyimide polymers. More particularly, this invention is directed to the recovery of usable diamine and tetracarboxylic acid monomers from a certain class of aromatic polyimides.

According to the invention, the polyimides are subjected to alkaline hydrolysis under certain conditions, causing precipitation of monomeric diamine which is separated, followed by neutralization of the mother liquor with acid, causing precipitation of monomeric aromatic tetracarboxylic acid compound which is separated.

In an alternative aspect, the alkaline hydrolysis is carried out at elevated temperature in the presence of an alcohol to effect precipitation of monomeric aromatic tetracarboxylic acid salt which is separated and converted by acid to the tetracarboxylic acid. The remaining mother liquor is cooled to precipitate monomeric diamine which is separated.

This invention is important for the recovery of valuable monomers from scrap polyimides. It is also highly useful for disposing of such scrap which is difficult to destroy by ordinary means such as burning in an incinerator.

The aromatic polyimide polymers which can be treated according to the process of this invention are linear polyimides having recurring structural units of the formula:

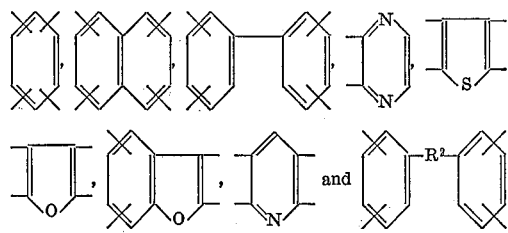

where R is a tetravalent aromatic radical selected from the group

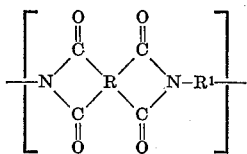

where $R^2$ is selected from the group consisting of alkylene of 1 through 3 carbons, —O—, —S—, —SO$_2$—,

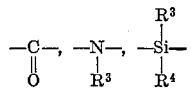

and

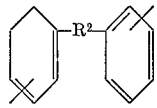

where $R^3$ and $R^4$ are alkyl or aryl, and substituted groups thereof; and $R^1$ is a divalent aromatic radical selected from the group consisting of naphthylene, biphenylene, anthrylene, benzfurylene and

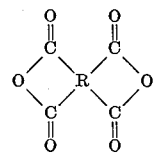

where $R^2$ has the same meaning as above.

Polyimides of the above-described type are generally known and are conveniently prepared, for example, according to procedures disclosed in Edwards U.S. Pat. No. 3,179,634 issued Apr. 20, 1965, by reaction of a diamine of the formula H$_2$N—R$^1$—NH$_2$ with a tetracarboxylic acid dianhydride of the formula:

$$\begin{array}{c} O \quad\quad O \\ \parallel \quad\quad \parallel \\ C \quad\quad C \\ O{\diagdown}\;\;\;{\diagup}R{\diagdown}\;\;\;{\diagup}O \\ C \quad\quad C \\ \parallel \quad\quad \parallel \\ O \quad\quad O \end{array}$$

where R and $R^1$ have the same meaning as above.

It is the purpose of this invention to recover in useful quality such diamine and the tetracarboxylic acid corresponding to such dianhydride. The acid salt can of course be obtained or, if desired, the dianhydride itself can be obtained by dehydration of the acid.

Illustrative of the diamines which are useful in the preparation of the above-described polyimides, and which can be recovered from the appropriate polyimide by practice of the present invention, are the following: 4,4'-diamino-diphenyl propane; 4,4'-diamino-diphenyl methane; benzidine; 4,4'-diamino-diphenyl sulfide, 4,4'-diamino-diphenyl sulfone; 3,3' - diamino-diphenyl sulfone; 4,4' - diamino-diphenyl ether; bis-(4-amino-phenyl)-diethyl silane; bis-(4-amino-phenyl) diphenyl silane; bis-(4-amino-phenyl)-N-methylamine; 1,5-diamino naphthalene; 3,3'-dimethyl-4,4'-diamino-biphenyl; 3,3'-dimethoxy benzidine; 3,3'-dichlorobenzidene; bis(4-aminophenyl) ethyl phosphine oxide; bis-(4-amino-phenyl) phenyl phosphine oxide; bis-(4-amino-phenyl)-N-phenylamine; 4,4'-diaminobenzophenone; 3,3'-diaminobenzophenone; and 3,4'-diaminobenzophenone.

Illustrative of the aromatic tetracarboxylic acids recoverable from the appropriate polyimide by practice of the present invention are the acids corresponding to the following dianhydrides from which the polyimide could have been derived; pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; bis(3,4-dicarboxyphenyl) ether dianhydride; naphthalene-1,2,4,5-tetracarboxylic dianhydride; naphthalene-1,4,5,8-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene 1,4,5,8-tetracarboxylic dianhydride; pyrrolidine-2,3,4,5-tetracarboxylic dianhydride; pyrazine-2,3,5,6-tetracarboxylic dianhydride; pyrazine-2,3,5,6-tetracarboxylic dianhydride; 2,2-bis(2,3-dicarboxyphenyl)propane dianhydride; 1,1-bis(2,3-dicarboxyphenyl) ethane dianhydride; 1,1-bis(3,4-dicarboxyphenyl) ethane dianhydride; bis (2,3-dicarboxyphenyl) methane dianhydride; bis(3,4-dicarboxyphenyl) methane dianhydride; bis(2,3-dicarboxyphenyl) sulfone dianhydride; benzene-1,2,3,4-tetracarboxylic dianhydride; thiophene-2,3,4,5-tetracarboxylic dianhydride; 3,4,3',4'-benzophenone tetracarboxylic dianhydride; 2,3,2',3'-benzophenone tetracarboxylic dianhydride; 2,3,3',4'-benzophenone tetracarboxylic dianhydride; and bis(3,4-dicarboxyphenyl)sulfide dianhydride.

According to this invention, the polyimide is dissolved in an aqueous solution of a hydroxide of ammonia or an alkali metal, including sodium, potassium, lithium, rubidium and cesium, and held until the diamine precipitates as a solid. Sodium hydroxide and ammonium hydroxide are preferred.

The amount of hydroxide compound should be at least 2, and preferably from about 2 to about 5, moles of such compound per mole of imide nitrogen in the polymer chain of the polyimide being treated. Excessive amounts of such hydroxide compound tend to decompose the monomers obtained and should be avoided.

The concentration of the hydroxide compound in water will generally be in the range from about 1% to 30%, and preferably from 2% to 25%, by weight. At very low concentrations, the rates of both dissolution and hydrolysis are greatly reduced. At very high concentrations, there is a tendency to form lumps which decreases the hydrolysis rate.

Dissolution and hydrolysis generaly occur in the temperature range of about 100° C. to 200° C. with preferred results being obtained from about 140° C. to 175° C. Below 140° C. the reaction will normally proceed more slowly than desired. Above 200° C. yield losses and purity losses may occur due to monomer decomposition.

Dissolution and hydrolysis will ordinarily be substantially complete in 24 hours or less and can be assisted if desired by stirring or other agitation. Autogenous pressures are ordinarily preferred; higher can be used. An inert atmosphere such as nitrogen is preferred.

Upon cooling, the diamine precipitates as a crystalline solid. Following precipitation of the diamine, the diamine can be readily separated and recovered from the mother liquor by any convenient physical means such as filtration, centrifugation, decantation, or the like.

After separation of the diamine, the mother liquor is a solution of tetracarboxylic acid salt plus leftover hydroxide compound plus water. It will generally be useful to concentrate this liquor at this point to facilitate a higher percent recovery of tetracarboxylic acid but this concentration is of course not essential. One convenient method of concentration is to boil off water under reduced pressure. If desired, the solution can optionally be decolorized by treatment with a suitable material such as carbon black.

To the mother liquor, preferably after cooling to about room temperature, is next added a mineral acid such as hydrochloric acid, sulfuric acid, nitric acid, or the like, to neutralize the solution and effect precipitation of tetracarboxylic acid compound. Such precipitation occurs readily at room temperature and the acid compound can be separated and recovered by any convenient physical technique of the type referred to above. The acid can be used as such or further dehydrated to the anhydride if desired.

In a related aspect, referred to above, this invention involves dissolving the polyimide in an aqueous solution of a hydroxide of an alkali metal named above, the solution also containing an alcohol of the group consisting of diols and triols of 2 through 4 carbons, such as ethylene glycol, 1,2-propylene glycol, 1,3-propylene glycol, glycerol, butylene-1,2-diol, butylene-2,3-diol and 2-methylpropane-1,2-diol. The alcohol will be used in an amount sufficient to cause the diamine to be soluble but the tetracarboxylic acid to be insoluble as its sodium salt in the solution at the temperature used.

The amount of alkali metal hydroxide will be the same as described above.

The concentration of the alkali metal hydroxide in the solvent (water plus alcohol) will be 1–30%, and preferably 2–25%, by weight. The solvent will be 1 to 20% water and 80 to 99% alcohol, on a weight basis. Other conditions of dissolution and hydrolysis are as recited above.

Dissolution and hydrolysis in the presence of the alcohol effects precipitation at the elevated temperature of the tetracarboxylic acid salt corresponding to the particular alkali metal hydroxide used. The salt is readily separated and recovered from the hot solution by any convenient physical means such as mentioned above. The salt can then be acidified with a suitable mineral acid to obtain the desired tetracarboxylic acid. The remaining mother liquor is cooled to effect precipitation of the diamine which can be separated and recovered as above.

The processes of this invention permit the recovery from scrap polyimides of the class described above of the tetracarboxylic acid or dianhydride and diamine in good yield and excellent quality. The quality is satisfactory, for example, for using the monomers in polymerization reactions to produce useful polyamide-acids, polyamide-esters, polyamide-amides, etc.

This invention will be more clearly understood by reference to the following illustrative examples.

EXAMPLE 1

An autoclave is charged with 600 parts by weight of scrap film of the polypyromellitimide of bis(4-aminophenyl)ether and 5,000 parts by weight of 10% by weight aqueous ammonium hydroxide. The charge is cooked (autogenous pressure) at 150–160° C. for 6 hours, producing complete dissolution of the film, with practically no polymer remaining (substantially complete hydrolysis). The hot solution is decolorized by treatment with carbon black, and then cooled to 100° C. Crystals of bis(4-aminophenyl) ether separate in excellent yield. The mother liquor is boiled down to about one-third of its original volume and acidified hot with a solution of 37% hydrochloric acid using a slight excess of acid over that required to neutralize the solution. The resulting solution is treated with carbon black and then cooled to cause crystallization of an excellent yield of pyromellitic acid which is filtered and washed with water.

EXAMPLE 2

When 10% by weight aqueous sodium hydroxide is substituted for ammonium hydroxide in Example 1, similar results are obtained.

EXAMPLE 3

In a more detailed procedure, the polyimide of Example 1 or others within the above scope can be treated as follows:

The scrap polyimide is first flaked. For each one pound of flaked polyimide there is used one gallon of water and 0.628 pound of sodium hydroxide (100%). This amount of sodium hydroxide amounts to a 50% excess over that theoretically required to hydrolyze the polymer completely to the two monomers. The reaction vessel is purged with nitrogen, then pressured with nitrogen to 50 p.s.i.g., heated until the pressure is 60 p.s.i.g., then depressurized to 0 p.s.i.g., at which point the reaction vessel is sealed. The temperature of the vessel is then raised to 155° C., at which point the pressure within the vessel is about 70 to 75 p.s.i.g. The reaction vessel is held under these conditions for four hours. The reaction vessel is then depressurized and cooled to 75° C. The diamine is insoluble under these conditions and is collected by filtration. The filtrate is a solution of the tetrasodium salt of the acid and excess sodium hydroxide. The filtrate is concentrated to 40% of its original volume by distillation under reduced pressure at a temperature of 93 to 97° C. The concentrated filtrate is then again filtered, this time through a filter with five-micron pores to carefully remove any insoluble material (which may include traces of the diamine). To this filtrate is added 37% hydrochloric acid until the pH of the acidified solution is no greater than 0.3 at 28° C. The mixture is heated to a temperature of 85 to 90° C., decolorizing carbon is added, and the solution is filtered at a temperature of 85 to 90° C. through a filter with five-micron pores in order to clarify it. The tetracarboxylic acid is then crystallized by holding the filtrate at a temperature between 85 and 70° C. for 45 minutes, holding it at 70° C. for one hour, then cooling between 70° C. and 20° C. during three hours, then holding at 20° C. for at least one hour before filtering. The crystallized tetracarboxylic acid is then recovered by filtration. The recovered diamine and tetracarboxylic acid are each further washed with additional water. The diamine, after drying preferably under vacuum or in a nitrogen atmosphere, can be used for polymerization. The tetracarboxylic acid, after drying and then dehydration to the dianhydride, is ready for use in polymerization. If a 100% excess of alkali is used in the hydrolysis at 155° C. the reaction time can be reduced to 2 hours. If only a 30% excess of alkali is used under the same conditions, the hydrolysis time is extended to about 5 to 6 hours.

EXAMPLES 4–13

The following polyimides can be treated according to the preceding examples, giving good yields of high quality tetra acids and diamines:

Polyimide of 3,4,3′4′-benzophenone tetracarboxylic acid and bis(4-aminophenyl) ether
Polypyromellitimide of benzidine
Polypyromellitimide of bis(4-aminophenyl) sulfide
Polypyromellitimide of bis(4-aminophenyl) sulfone
Polypyromellitimide of bis(4-aminophenyl) methane
Polypyromellitimide of bis(4-aminophenyl) ethane
Polypyromellitimide of bis(4-aminophenyl) propane
Polyimide of 3,4,3′,4′-benzophenone tetracarboxylic acid and bis(4-aminophenyl) methane
Polyimide of 3,4,3′,4′-benzophenone tetracarboxylic acid and 1,1-bis(4-aminophenyl) ethane
Polyimide of 3,4,3′,4′-benzophenone tetracarboxylic acid and 2,2-bis(4-aminophenyl) propane The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. The process of recovering diamine and tetracarboxylic acid from a polyimide of said diamine and said tetracarboxylic acid, said polyimide being a linear polymer having recurring structural units of the formula

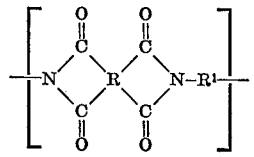

where R is a tetravalent aromatic radical selected from the group consisting of

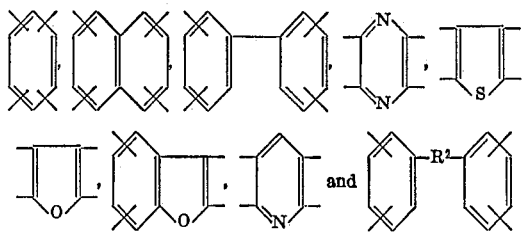

where $R^2$ is selected from the group consisting of alkylene of 1 through 3 carbons, —O—, —S—, —$SO_2$—

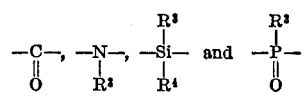

where $R^3$ and $R^4$ are each selected from the group consisting of alkyl and aryl; and $R^1$ is a divalent aromatic radical selected from the group consisting of naphthylene, biphenylene, anthrylene, benzfurylene and

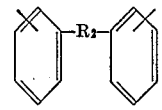

where $R^2$ has the same meaning as above; said process comprising the steps of,
(1) dissolving said polyimide in an aqueous solution of a hydroxide compound selected from the group consisting of the hydroxides of ammonia, sodium, potassium, lithium, rubidium and cesium,
  (a) the amount of said hydroxide compound being at least 2 moles of said hydroxide compound per mole of imide nitrogen in the polymer chain of said polyimide, and
  (b) the concentration of said hydroxide compound in the water being in the range of about 1% to 30% by weight;
(2) heating said aqueous solution to a temperature of between about 100° C. and 200° C. thereby to hydrolyze said polyimide;
(3) cooling said aqueous solution thereby to effect precipitation of said diamine;
(4) separating said precipitated diamine from said solution;
(5) addng to said solution a mineral acid selected from the group consisting of hydrochloric acid, sulfuric acid and nitric acid in an amount sufficient to neutralize said solution and effect precipitation of said tetracarboxylic acid; and
(6) separating said precipitated tetracarboxylic acid from said solution.

2. The process as in claim 1 wherein said polyimide is the polypyromellitimide of bis(4-aminophenyl) ether.

3. The process as in claim 1 wherein said hydroxide compound is sodium hydroxide.

4. The process as in claim 1 wherein said hydroxide compound is ammonium hydroxide.

5. The process as in claim 1 wherein step (2) is carried out at a temperature in the range of 140°–175° C.

6. The process of recovering diamine and tetracarboxylic acid from a polyimide of said diamine and said tetracarboxylic acid, said polyimide being a linear polymer having recurring structural units of the formula

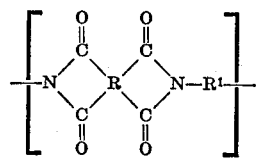

where R is a tetravalent aromatic radical selected from the group consisting of

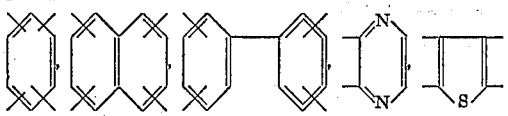

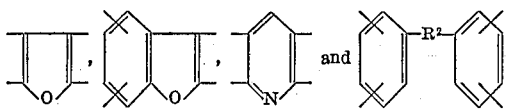

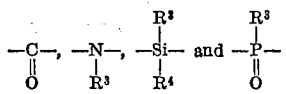 and 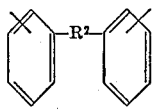

where $R^2$ is selected from the group consisting of alkylene of 1 through 3 carbons, —O—, —S—, —$SO_2$—, $$-\underset{\underset{O}{\|}}{C}-,\ -\underset{\underset{R^3}{|}}{N}-,\ -\underset{\underset{R^4}{|}}{\overset{\overset{R^3}{|}}{Si}}-\ \text{and}\ -\underset{\underset{O}{\|}}{\overset{\overset{R^3}{|}}{P}}-$$

where $R^3$ and $R^4$ are each selected from the group consisting of alkyl and aryl; and $R^1$ is a divalent aromatic radical selected from the group consisting of naphthylene, biphenylene, anthrylene, benzfurylene and where $R^1$ has the same meaning as above; said process comprising the steps of:
(1) dissolving said polyimide in an aqueous solution of an alkali metal hydroxide,
 (a) the amount of said hydroxide being at least 2 moles of said hydroxide per mole of imide nitrogen in the polymer chain of said polyimide;
 (b) said aqueous solution containing 1–20% water and 80–99% of an alcohol selected from the group consisting of diols and triols of 2 through 4 carbons, by weight based on the total weight of said water and said alcohol; and
(2) heating said aqueous solution to a temperature of between about 100° C. and about 200° C. thereby to hydrolyze said polyimide and precipitate said tetracarboxylic acid in the form of its salt of said alkali metal, and separating and recovering said salt;
(3) cooling the resulting solution to effect precipitation of said diamine;
(4) separating said precipitated diamine from said solution; and
(5) treating said separated and recovered precipitate of said tetracarboxylic acid in the form of its salt of said alkali metal (step 2), optionally between steps (2) and (3) above or subsequently, with a mineral acid selected from the group consisting of hydrochloric acid, sulfuric acid and nitric acid to convert said precipitate to said tetracarboxylic acid and separating said tetracarboxylic acid as the product.

7. The process as in claim 6 wherein said polyimide is the polypyromellitimide of bis (4-aminophenyl) ether.

8. The process as set forth in claim 6 wherein said hydroxide is sodium hydroxide.

9. The process as set forth in claim 6 wherein said hydroxide is ammonium hydroxide.

10. The process as set forth in claim 6 wherein step (2) is carried out at a temperature in the range of 140°–175° C.

References Cited

Rovira, Chem. Abstracts, vol. 40, pp. 4348–4349.

Papoff et al., Chem. Abstract, vol. 54, pp. 23643–23644.

Owen, Chem. Abstracts, vol. 59, pp. 8649c (1963).

Morrison et al., "Organic Chemistry," p. 686, Allyn & Bacon, 1959 (Boston).

JAMES A. PATTEN, Primary Examiner

U.S. Cl. X.R.

260—250, 295.5, 332.2, 346.2, 347.3, 448.2, 470, 471, 578